(12) United States Patent
Kim et al.

(10) Patent No.: US 11,332,413 B2
(45) Date of Patent: May 17, 2022

(54) CONTROLLED-RELEASE FERTILIZERS

(71) Applicants: LG CHEM, LTD., Seoul (KR); FARMHANNONG CO., LTD., Seoul (KR)

(72) Inventors: Chanjoong Kim, Daejeon (KR); Sangryeo Lee, Daejeon (KR); Joon Seok Lee, Daejeon (KR); Yil Jang, Daejeon (KR); Ji Yeon Kim, Sejong (KR); Jae Hoon Choe, Daejeon (KR)

(73) Assignees: LG Chem, Ltd., Seoul (KR); Farmhannong Co., Ltd., Seoul (KR)

( * ) Notice: Subject to any disclaimer, the term of this patent is extended or adjusted under 35 U.S.C. 154(b) by 0 days.

(21) Appl. No.: 16/964,932

(22) PCT Filed: Mar. 18, 2019

(86) PCT No.: PCT/KR2019/003121
§ 371 (c)(1),
(2) Date: Jul. 24, 2020

(87) PCT Pub. No.: WO2019/190104
PCT Pub. Date: Oct. 3, 2019

(65) Prior Publication Data
US 2021/0040009 A1 Feb. 11, 2021

(30) Foreign Application Priority Data

Mar. 28, 2018 (KR) .................. 10-2018-0035997
Mar. 11, 2019 (KR) .................. 10-2019-0027740

(51) Int. Cl.
*C05G 3/40* (2020.01)
*C05G 5/12* (2020.01)
*C05G 5/35* (2020.01)

(52) U.S. Cl.
CPC ............... *C05G 3/40* (2020.02); *C05G 5/12* (2020.02); *C05G 5/35* (2020.02)

(58) Field of Classification Search
None
See application file for complete search history.

(56) References Cited

U.S. PATENT DOCUMENTS 4,369,055 A * 1/1983 Fujita .................. B01J 2/30 71/64.11
4,881,963 A * 11/1989 Fujita .................. B01J 2/30 71/64.07

(Continued)

FOREIGN PATENT DOCUMENTS

| CN | 1195966 A | 10/1998 |
|---|---|---|
| CN | 1854111 A | 11/2006 |

(Continued)

OTHER PUBLICATIONS

O. Benhabiles et al., "Effectiveness of a photocatalytic organic membrane for solar degradation of methylene blue pollutant", Desalination and Water Treatment, 2015, pp. 1-10.

(Continued)

*Primary Examiner* — Wayne A Langel
(74) *Attorney, Agent, or Firm* — Dentons US LLP

(57) ABSTRACT

The present disclosure relates to a controlled-release fertilizer and, more particularly, to a controlled-release fertilizer including: a photodegradable capsule including a binder resin containing a polyolefin and an ethylene vinyl acetate copolymer; and a photocatalytic composite in which a (meth)acrylate compound containing an alkylene glycol repeating unit having 1 to 10 carbon atoms is bonded to the surface or inside of aggregates of inorganic fine particles, and a fertilizer contained in a space surrounded by the photodegradable capsule.

15 Claims, 1 Drawing Sheet

(56) References Cited

U.S. PATENT DOCUMENTS

| | | | |
|---|---|---|---|
| 5,176,734 A | 1/1993 | Fujita et al. | |
| 6,036,971 A | 3/2000 | Kimoto et al. | |
| 6,193,775 B1* | 2/2001 | Fujita | C05G 5/38 |
| | | | 71/27 |
| 6,235,388 B1 | 5/2001 | Yamamoto et al. | |
| 6,509,440 B1 | 1/2003 | Sakane et al. | |
| 2005/0154128 A1 | 7/2005 | Kopchik et al. | |
| 2006/0141010 A1* | 6/2006 | Karl | C05G 5/37 |
| | | | 424/442 |
| 2009/0202652 A1 | 8/2009 | Stowell | |
| 2012/0157580 A1 | 1/2012 | Yoshino et al. | |
| 2012/0302476 A1 | 11/2012 | Koschabek et al. | |
| 2013/0137625 A1 | 5/2013 | Stowell | |
| 2013/0199742 A1 | 8/2013 | Holter et al. | |
| 2014/0377007 A1 | 12/2014 | Charles et al. | |
| 2019/0194083 A1 | 6/2019 | Silverstein et al. | |

FOREIGN PATENT DOCUMENTS

| | | |
|---|---|---|
| CN | 102470177 A | 5/2012 |
| CN | 103980738 A | 8/2014 |
| CN | 104557323 A | 4/2015 |
| CN | 104804141 A | 7/2015 |
| CN | 103588561 B | 10/2015 |
| CN | 103342910 B | 11/2015 |
| CN | 105636922 A | 6/2016 |
| JP | H05-093022 A | 4/1993 |
| JP | H11-043391 A | 2/1999 |
| JP | 2001-031489 A | 2/2001 |
| JP | 2001232122 A | 8/2001 |
| JP | 2001288295 A | 10/2001 |
| JP | 2001348498 A | 12/2001 |
| JP | 2002293684 A | 10/2002 |
| JP | 2003-192848 A | 7/2003 |
| JP | 2003-342095 A | 12/2003 |
| JP | 2004075479 A | 3/2004 |
| JP | 2004089178 A | 3/2004 |
| JP | 2004-273087 A | 9/2004 |
| JP | 2009514660 A | 4/2009 |
| JP | 2011526973 A | 10/2011 |
| JP | 2013519800 A | 5/2013 |
| JP | 2017002282 A | 1/2017 |
| KR | 1999-0035939 A | 5/1999 |
| KR | 10-2010-0110949 A | 10/2010 |
| KR | 2020120003398 U | 5/2012 |
| KR | 10-2012-0083364 A | 7/2012 |
| KR | 10-1331454 B1 | 11/2013 |
| KR | 10-1410859 B1 | 7/2014 |
| WO | 9826115 A1 | 6/1998 |
| WO | 1998-037039 A1 | 8/1998 |
| WO | 2000029460 A1 | 5/2000 |
| WO | 2008-089140 A1 | 7/2008 |
| WO | 2010117168 A2 | 10/2010 |
| WO | 2015056918 A1 | 4/2015 |
| WO | 2017-100858 A1 | 6/2017 |
| WO | 2018033913 A1 | 2/2018 |

OTHER PUBLICATIONS

W. Tao et al., "Photopolymerization kinetic study on titania—polyacrylates manocomposite", Modem Chemical Industry, Apr. 20, 2005, pp. 32-35.

Y. Sheng et al., "Study on nano-titanium dioxide and its coated polyacrylate dispersion", Technical Textiles, vol. 36, Feb. 25, 2018, pp. 38-44.

S. Zheng, "The study on synthesis of nano-Tio/acrylate composite emulsion", Textile Auxiliaries, vol. 34, No. 1, Jan. 20, 2017, pp. 18-22.

* cited by examiner

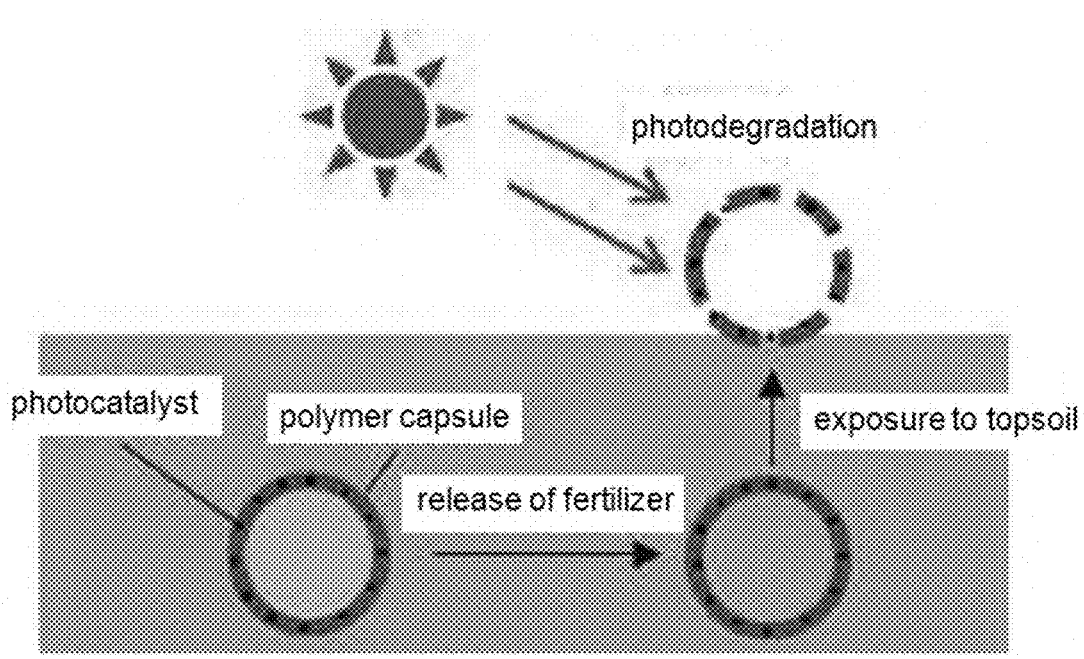

CONTROLLED-RELEASE FERTILIZERS

CROSS-REFERENCE TO RELATED APPLICATION(S)

The present application is a National Phase entry pursuant to 35 U.S.C. § 371 of International Application No. PCT/KR2019/003121 filed on Mar. 18, 2019, and claims the benefits of the filing dates of Korean Patent Application No. 10-2018-0035997 filed with Korean Intellectual Property Office on Mar. 28, 2018 and Korean Patent Application No. 10-2019-0027740 filed with Korean Intellectual Property Office on Mar. 31, 2019, the entire contents of which are incorporated herein by reference.

FIELD

The present invention relates to a controlled-release fertilizer. More specifically, the invention relates to a controlled-release fertilizer having a high stability against moisture and a rigid structure, and capable of easily controlling a release period of a fertilizer and further realizing excellent photodegradation efficiency.

BACKGROUND

Various controlled-release fertilizers have been developed for the purpose of labor-saving fertilization, or for exhibiting the effect of a fertilizer according to the growth of plants.

In these controlled-release fertilizers (CRF), fertilizer components such as nitrogen, phosphorus and potassium are slowly supplied to crops for a long period of time.

Conventional fertilizers, which are sprayed by mixing with water or sprayed in the form of powder, are usually difficult to sustain the effect for more than 20 days when sprayed once.

This is because fertilizer components are washed away in the rain or deeply penetrated underground and thus, it is difficult for crops to absorb fertilizer components. Because of these problems, the fertilizer must be frequently sprayed in an excessive amount.

In order to complement the drawbacks of such general fertilizer, the controlled-release fertilizer reduces the release rate of the fertilizer components with a polymer capsule so that it is released for a long period of time.

The polymer capsule is made of olefin-based resins, urethane-based resin, latex, acrylic resin, etc. While water vapor penetrates through the capsules, the fertilizer components are dissolved, and then is released through the capsules by the principle of osmotic pressure.

The penetration rate of water and the fertilizer components varies depending on the type of components for preparing capsules, and the thickness of the capsules.

This can be used to control the rate at which the fertilizer components are released to the outside.

The period during which the fertilizer components are released from the capsule can be adjusted from a minimum of 30 days to a maximum of 2 years.

However, there is a problem that the capsule polymer remains in soils or in streams without being degraded after the release of the fertilizer.

In order to solve these problems, attempts have been made to use a biodegradable polymer as a capsule material. However, because biodegradable polymers have a rapid moisture penetration and are degraded by microorganisms within a period of 1 month to 6 months, and thus are not suitable to be used for the controlled-release fertilizers which must be released over a period from a minimum of 1 month to 2 years.

SUMMARY

An object of the present invention is intended to provide a controlled-release fertilizer having a high stability against moisture and a rigid structure, and capable of easily controlling a release period of a fertilizer, and further of realizing excellent photodegradation efficiency.

In one aspect of the invention, there is provided a controlled-release fertilizer including: a photodegradable capsule including a binder resin containing a polyolefin and an ethylene vinyl acetate copolymer; and a photocatalytic composite in which a (meth)acrylate compound containing an alkylene glycol repeating unit having 1 to 10 carbon atoms is bonded to the surface or inside of aggregates of inorganic fine particles, and a fertilizer contained in a space surrounded by the photodegradable capsule.

Hereinafter, the controlled-release fertilizer according to specific embodiments of the present invention will be described in more detail.

According to one embodiment of the present invention, there can be provided a controlled-release fertilizer including: a photodegradable capsule including a binder resin containing a polyolefin and an ethylene vinyl acetate copolymer; and a photocatalytic composite in which a (meth)acrylate compound containing an alkylene glycol repeating unit having 1 to 10 carbon atoms is bonded to the surface or inside of aggregates of inorganic fine particles, and a fertilizer contained in a space surrounded by the photodegradable capsule.

The present inventors have found through experiments that the controlled-release fertilizer in which the photodegradable capsule including the above-mentioned photocatalytic composite together with the binder resin containing a polyolefin and an ethylene vinyl acetate copolymer has been formed can have a high stability against moisture and a rigid structure, and capable of easily controlling a release period of a fertilizer and further realizing excellent photodegradation efficiency, thereby completing the present invention.

The characteristic of the above-mentioned controlled-release fertilizer may also be attributed to uniformly dispersing the photocatalytic composite in the above-mentioned binder resin.

Specifically, as the (meth)acrylate compound containing an alkylene glycol repeating unit having 1 to 10 carbon atoms is bonded to the surface or inside of the aggregates of inorganic fine particles, the inorganic fine particles can be uniformly dispersed during the manufacturing process of the controlled-release fertilizer or in the controlled-release fertilizer, and accordingly, the aggregates of inorganic fine particles may have a particle size that is not so large.

In this way, the aggregates of the inorganic fine particles are uniformly dispersed in the binder resin while having a particle size that is not so large, and when the photodegradable capsule is exposed to light, the photodegradation reaction occurs locally, thereby making it possible to prevent the phenomenon that the photodegradation efficiency is deteriorated, and also to prevent the photodegradable capsule from remaining in soils.

The characteristic of the controlled-release fertilizer may be attributed to the binding of the (meth)acrylate compound containing an alkylene glycol repeating unit having 1 to 10 carbon atoms to the surface or inside of the aggregates of inorganic fine particles.

That is, as the (meth)acrylate compound containing an alkylene glycol repeating unit having 1 to 10 carbon atoms is bonded to the surface or inside of the aggregates of inorganic fine particles, the growth of the aggregates of inorganic fine particles may be controlled, and also, due to the characteristics of the (meth)acrylate compound, it may have higher compatibility with the binder resin, so that the photocatalytic composite can be uniformly distributed in the binder resin.

As described above, the controlled-release fertilizer can realize excellent photodegradation efficiency.

More specifically, when a light having a wavelength of 300 to 800 nm is irradiated to the fertilizer at an intensity of 400 w/m$^2$ for 224 hours, the degradation rate of the binder resin derived from the weight change of the photodegradable capsule may be 35% or more, or 40% or more.

The inorganic fine particles may act as a photocatalyst.

The controlled-release fertilizer of the embodiment is characterized by uniformly dispersing the photocatalytic composite in the binder resin in order to solve the problem that the photodegradable capsule remains in soils.

The photocatalytic composite can act as a catalyst only when it receives light. Therefore, during the release of the fertilizer in soils where light is blocked, the fertilizer is gradually released during the release period in a state where the photodegradable capsule is not degraded.

Then, when the controlled-release fertilizer is exposed to a topsoil by plowing, etc., after the fertilizer has been released, the photodegradable capsule may be degraded by light.

The inorganic fine particle may include a primary particle having a cross-sectional diameter of 5 to 50 nm.

The cross-sectional diameter of the primary particles of the inorganic fine particles may be confirmed by a commonly known method, for example, through a TEM image, a BET measurement, and the like.

If the cross-sectional diameter of the primary particles contained in the inorganic fine particles is too small, the degree of crystallization may be decreased and thus the photocatalytic efficiency may be deteriorated.

In addition, if the cross-sectional diameter of the primary particles contained in the inorganic fine particles is too large, the specific surface area of the photocatalyst particles may be reduced and thus the photocatalytic efficiency may be deteriorated.

Meanwhile, the aggregates of inorganic fine particles contained in the controlled-release fertilizer of the embodiment may have a particle size that is not so large. Specifically, the aggregates of inorganic fine particles may have a cross-sectional diameter of 1 μm or less, or a cross-sectional diameter of 0.05 μm to 0.5 μm.

The cross-sectional diameter of the aggregates of inorganic fine particles may be confirmed by a commonly known method, for example, through SEM or TEM microtome.

If the cross-sectional diameter or the overall size of the aggregates of inorganic fine particles is too large, a local photodegradation reaction may occur in the photodegradable capsule, or the efficiency of the photodegradation reaction may be deteriorated. In addition, due to the inefficient photodegradation reaction, the entire photodegradable capsule may not be degraded and residues may remain.

Specific examples of the inorganic fine particles include titanium dioxide ($TiO_2$), zinc oxide (ZnO), or a mixture thereof.

Meanwhile, the binder resin may be a main material for forming the outer structure of the photodegradable capsule, and as described above, the binder resin may include a polyolefin and an ethylene vinyl acetate copolymer.

Examples of the polyolefin are not particularly limited, but for example, it may include a high-density or low-density polyethylene, a linear low-density polyethylene, a polypropylene, an ethylene-propylene copolymer, a polybutene, a butene-ethylene copolymer and a butene-propylene copolymer, a mixture of two or more thereof, or a copolymer of two or more thereof.

The ethylene vinyl acetate copolymer contained in the binder resin is also not particularly limited, and for example, an ethylene vinyl acetate copolymer containing 1% to 45% by weight of a vinyl acetate repeating unit may be used.

Further, the ethylene vinyl acetate copolymer may have a melt index of 0.5 g/10 min to 5.0 g/10 min or 1.0 g/10 min to 3.0 g/10 min, as measured at 190° C. under a load of 2.16 kg according to ASTM D1238.

The weight ratio between the polyolefin and the ethylene vinyl acetate copolymer contained in the binder resin is not particularly limited, and for example, the binder resin may include the polyolefin:ethylene vinyl acetate copolymer in a weight ratio of 1:1 to 6:1.

As such, as the binder resin includes the polyolefin resin in an amount equal to or greater than that of the ethylene vinyl acetate copolymer, the release rate of the fertilizer may be more easily controlled.

Meanwhile, the photocatalytic composite may have a structure in which the (meth)acrylate compound containing an alkylene glycol repeating unit having 1 to 10 carbon atoms is bonded to the surface or inside of the aggregates of inorganic fine particles.

As described above, the aggregates of inorganic fine particles can act as a photocatalyst, and when the controlled-release fertilizer is exposed to the surface of the soil or the like, it becomes possible to initiate a photodegradation reaction in the photodegradable capsule.

The (meth)acrylate compound containing an alkylene glycol repeating unit having 1 to 10 carbon atoms is bonded to the surface or inside of the aggregates of inorganic fine particles, and consequently, it prevents the aggregates of inorganic fine particles from growing excessively and makes it possible to have higher compatibility with the binder resin so that the photocatalytic composite can be uniformly dispersed in the binder resin.

The (meth)acrylate compound containing an alkylene glycol repeating unit having 1 to 10 carbon atoms may be 1) (meth)acrylates, di(meth)acrylates or esters thereof to which a polyalkylene glycol having a number average molecular weight of 100 to 2,000 is bonded; 2) trifunctional to octafunctional (meth)acrylates containing an alkylene glycol repeating unit having 1 to 10 carbon atoms, or esters thereof; or a mixture or copolymer of two or more thereof.

More specifically, the (meth)acrylates, di(meth)acrylates or esters thereof to which a polyalkylene glycol having a number average molecular weight of 100 to 2,000 is bonded may be poly(ethylene glycol)(meth)acrylate or poly(ethylene glycol)methyl ether (meth)acrylate.

In addition, the trifunctional to octafunctional (meth)acrylates containing an alkylene glycol repeating unit having 1 to 10 carbon atoms, or esters thereof may be trimethylolpropane triacrylate, trimethylol propane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, or dipentaerythritol hexaacrylate.

In the photocatalytic composite, the weight ratio between the aggregates of inorganic fine particles and the (meth)

acrylate compound containing an alkylene glycol repeating unit having 1 to 10 carbon atoms is not particularly limited, and the weight ratio or the like can be adjusted by controlling the amount dispersed in the organic solvent according to the characteristics of the controlled-release fertilizer.

For example, the photocatalytic composite may contain 1 to 500 parts by weight or 20 to 200 parts by weight of the (meth)acrylate compound containing an alkylene glycol repeating unit having 1 to 10 carbon atoms relative to 100 parts by weight of the aggregates of inorganic fine particles.

Meanwhile, the aggregates of inorganic fine particles may be contained in an amount of 0.1 to 8 parts by weight relative to 100 parts by weight of the binder resin.

If the content of the aggregates of inorganic fine particles relative to the binder resin in the photodegradable capsule is too low, the efficiency of photodegradation reaction may be lowered, and due to the insufficient photodegradation reaction, the entire photodegradable capsule may not be degraded and residues may remain.

Further, if the content of the aggregates of inorganic fine particles relative to the binder resin in the photodegradable capsule is too large, the aggregates of inorganic fine particles may excessively grow, and thereby, a local photodegradation reaction may occur in the photodegradable capsule, or the efficiency of the photodegradation reaction may be lowered. As a result, the entire photodegradable capsule may not be degraded and residues may remain.

Meanwhile, the controlled-release fertilizer may further include a filler dispersed in the binder resin.

The type of the filler is not particularly limited, and for example, the filler may include talc, bentonite, loess, diatomaceous earth, silica, aluminosilicate, kaolinite, starch, carbon, or a mixture of two or more thereof.

The content of the filler is not particularly limited, but in consideration of the mechanical properties and structural stability of the photodegradable capsule, the controlled-release fertilizer may include 25% to 75% by weight of the filler relative to the total weight of the photodegradable capsule.

The fertilizer may be various known fertilizers, for example, a urea or compound fertilizer.

In a preferred embodiment, the fertilizer may be a granular core fertilizer having a granular form in order to be easily included in the photodegradable capsule.

The specific types of the fertilizer are not limited, and commonly known fertilizers may be used.

Preferable examples of the fertilizer include nitrogen-containing organic compounds such as urea, aldehyde-condensed urea, isobutyl aldehyde-condensed urea, formaldehyde-condensed urea, guanyl urea sulfate, and oxamide; ammonium and nitrate compounds such as ammonium nitrate, ammonium dihydrogen phosphate, diammonium hydrogen phosphate, ammonium sulfate, ammonium chloride, and sodium nitrate; potassium salts such as potassium nitrate, potassium phosphate, potassium sulfate, and potassium chloride; calcium salts such as calcium phosphate, calcium sulfate, calcium nitrate, and calcium chloride; magnesium salts such as magnesium nitrate, magnesium chloride, magnesium phosphate, and magnesium sulfate; iron salts such as ferrous nitrate, ferric nitrate, ferrous phosphate, ferric phosphate, ferrous sulfate, ferric sulfate, ferrous chloride and ferric chloride; and double salts thereof or a mixture of two or more thereof.

The content of the fertilizer in the controlled-release fertilizer is not particularly limited, and for example, it may be contained in an amount of 200 to 3,000 parts by weight relative to 100 parts by weight of the photodegradable capsule.

The photocatalytic composite may have a degree of dispersion unique to the photodegradable capsule.

More specifically, the photocatalytic composite may be prepared through the step of dispersing the (meth)acrylate compound containing an alkylene glycol repeating unit having 1 to 10 carbon atoms in an organic solvent.

By transferring a strong energy using sonication, a high-shear mixer or a bead mill, etc., in a state where the inorganic fine particles and the (meth)acrylate compound containing an alkylene glycol repeating unit having 1 to 10 carbon atoms are dispersed in an organic solvent, the (meth)acrylate compound containing an alkylene glycol repeating unit having 1 to 10 carbon atoms may be bonded to the surface or inside of the aggregates of inorganic fine particles.

The photocatalytic composite thus prepared can be very uniformly dispersed in the binder resin and thereby, the degradation efficiency of the photocatalyst can be remarkably enhanced.

The controlled-release fertilizer may further include a component contained in known controlled-release fertilizers.

For example, such component may include, but not limited to, an amphipathic polymer, etc.

Meanwhile, the controlled-release fertilizer may be provided through various preparation methods. For example, it may be prepared by the preparation method including the steps of preparing a dispersion solution of the photocatalytic composite by dispersing inorganic fine particles in an organic solvent to which (meth)acrylate compound containing an alkylene glycol repeating unit having 1 to 10 carbon atoms is added; preparing a coating composition by mixing a polyolefin, an ethylene vinyl acetate copolymer, the dispersion solution of the photocatalytic composite, and optionally a filler; and coating the surface of the granular fertilizer core with the coating composition.

Specific examples of the organic solvent are not particularly limited, and tetrachlorethylene (TCE), cyclohexene (CHN), dichloromethane (DCM), or 1,2,4-trichlorobenzene (TCB) or the like may be used.

In the step of preparing a dispersion solution of the photocatalytic composite by dispersing the inorganic fine particles in an organic solvent to which the ethylene vinyl acetate copolymer is added, the dispersion solution may be prepared using a strong energy, such as sonication or a bead mill, etc. For example, a dispersion solution in which the dispersion particle size of the photocatalyst is 5 to 1000 nm may be prepared by using a strong energy such as sonication or the like.

According to the present invention, there can be provided a controlled-release fertilizer having a high stability against moisture and a rigid structure, and capable of easily controlling a release period of a fertilizer and further realizing excellent photodegradation efficiency.

The controlled-release fertilizer can prevent soil contamination or the like by preventing a photodegradable capsule or a hydrophilic polymer from remaining in the soil.

BRIEF DESCRIPTION OF DRAWINGS

FIG. 1 schematically shows the photodegradation mechanism of the controlled-release fertilizer.

DETAILED DESCRIPTION

The present invention will be described in more detail with reference to the following examples. However, these examples are given for illustrative purposes only, and the scope of the invention is not intended to be limited to or by these examples.

EXAMPLES: PREPARATION OF CONTROLLED-RELEASE FERTILIZER

Examples 1 to 4

(1) Preparation of Photocatalytic Composite 0.43 g of (Meth)acrylate compound containing the alkylene glycol repeating unit shown in Table 1 below was dissolved in tetrachloroethylene, to which $TiO_2$ (average particle diameter of primary particles: 21 nm) was mixed in an amount shown in Table 1 below, and the mixture was stirred at high speed for 20 minutes by applying a shear rate of 20,000 $s^{-1}$.

Then, 0.015 g of a thermal polymerization initiator (AIBN) was added thereto, and the mixture was stirred at 90° C. for 30 minutes under a nitrogen gas atmosphere. Thereby, a dispersion of a photocatalytic composite in which a (meth)acrylate compound containing an alkylene glycol repeating unit was bonded to the surface and inside of the aggregates of inorganic fine particles was prepared.

(2) Preparation of Controlled-Release Fertilizer

The dispersion solution of the photocatalytic composite prepared above, polyethylene[LDPE, MI(melt index, 190° C., load of 2.16 kg, ASTM D1238): about 8 g/10 min, D(density): 0.925 g/cm³], ethylene vinyl acetate copolymer [MI(melt index, 190° C., load of 2.16 kg, ASTM D1238): about 1.8 g/10 min, D(density): 0.94 g/cm³, vinyl acetate content of about 20 wt %, melting point of 85° C.], and talc were used in an amount shown in Table 1 below and uniformly stirred and mixed with tetrachloroethylene at 90° C. in the composition ratio shown in Table 1 below to prepare a coating solution so as to have a solid component concentration of 5 wt %.

Then, the coating solution was applied to the nitrogen fertilizer particles using a fluid bed drier to prepare a controlled-release coated fertilizer (Examples 1 to 4).

Comparative Example: Preparation of Coated Fertilizer

Comparative Example 1

Polyethylene [LDPE, MI(melt index, 190° C., load of 2.16 kg, ASTM D1238): about 8 g/10 min, D(density): 0.925 g/cm³], ethylene vinyl acetate copolymer [MI(melt index, 190° C., load of 2.16 kg, ASTM D1238): about 1.8 g/10 min, D(density): 0.94 g/cm³, vinyl acetate content of about 20 wt %, melting point of 85° C.], and talc were used in an amount shown in Table 1 below and uniformly stirred and mixed with tetrachloroethylene at 100° C. in the composition ratio shown in Table 1 below to prepare a coating solution so as to have a solid component concentration of 5 wt %.

Then, the coating solution was applied to the nitrogen fertilizer particles using a fluid bed drier to prepare a coated fertilizer (Comparative Example 1)

Experimental Example

Experimental Example 1: Comparison Test of Photodegradation Characteristics 5 g of each of the controlled-release fertilizers of Examples 1-4 and the coated fertilizers of Comparative Example 1 was taken, and a pinhole was made with a needle for each fertilizer grain. The degradation evaluation was performed on the coating film remaining after the internal fertilizer was completely released.

A light having a wavelength of 300 nm to 800 nm was irradiated to the coating film at an intensity of 400 w/m² at a temperature of 50° C. using a Suntest CPS+ equipment (ATLAS).

Then, when light was irradiated for 224 hours under the above conditions, the degradation rate of the binder resin derived from the weight change of the coating film was determined by the following general formula 1, and the results are shown in Table 1 below.

$$\text{Photodegradation Rate} = \frac{\text{Change in weight of the coating film after UV irradiation}}{\text{Weight of resin in the coating film before UV irradiation}(LDPE + EVA)} \times 100\%$$

[General Formula 1]

TABLE 1

|  | Comparative Example 1 | Example 1 | Example 2 | Example 3 | Example 4 |
| --- | --- | --- | --- | --- | --- |
| Polyethylene (LDPE) | 28 g | 28 g | 28 g | 28 g | 28 g |
| EVA copolymer | 7 g | 7 g | 7 g | 7 g | 7 g |
| TALC | 65 g | 65 g | 65 g | 65 g | 65 g |
| $TiO_2$ | 0.7 g | 0.7 g | 0.7 g | 0.7 g | 0.7 g |
| $TiO_2$ dispersion treatment | — | ○ | ○ | ○ | ○ |
| (Meth)acrylate compound containing an alkylene glycol repeating unit | — | Poly(ethylene glycol) methacrylate(number average molecular weight: 360) | Poly(ethylene glycol) methyl ether acrylate (number average molecular weight: 480) | Trimethylolpropane triacrylate | Trimethylolpropane ethoxylate triacrylate |
| Degradation rate of binder resin (%) | 30 ± 3 | 35 ± 3 | 35 ± 3 | 41 ± 3 | 41 ± 3 |

As shown in Table 1, it was confirmed that the controlled-release fertilizers of Examples 1-4 showed a degradation rate of binder resin of 35% or more, when irradiated with a light having a wavelength of 300 nm to 800 nm at an intensity of 400 w/m² for 224 hours. In contrast, it was confirmed that the coated fertilizers of Comparative Example 1 showed a degradation rate of binder resin of less than 35%.

Experimental Example 2: Measurement of Z-Average Dispersion Particle Size of $TiO_2$ The z-average dispersion particle sizes of $TiO_2$ in the dispersion solution of the photocatalytic composite of Example 3 and the dispersion solution containing $TiO_2$ of Comparative Example 1 were measured using a Dynamic Light Scattering instrument (Malvern Zetasizer Nano ZS90).

The results are shown in Table 2 below.

TABLE 2

| Z-average dispersion particle size of $TiO_2$ | | |
|---|---|---|
| | Example 3 | Comparative Example 1 |
| z-average dispersion particle size of $TiO_2$ (nm) | 183 | About $2.0 \times 10^4$ |

As shown in Table 2, it is confirmed that the dispersion solution of the photocatalytic composite of Example 3 had a z-average dispersion particle size of about 183 nm, and thus $TiO_2$ particles used were homogeneously dispersed and the aggregates of inorganic fine particles having a relatively small average particle size were formed.

In contrast, it is confirmed that $TiO_2$ of the dispersion solution containing $TiO_2$ of Comparative Example 1 had a z-average dispersion particle size of about 10,000 nm or more, and thus aggregates of inorganic fine particles having a relatively large average particle size were formed.

The invention claimed is:

1. A controlled-release fertilizer, comprising:
   a photodegradable capsule including a binder resin containing a polyolefin and an ethylene vinyl acetate copolymer; and a photocatalytic composite in which a (meth)acrylate compound containing an alkylene glycol repeating unit having 1 to 10 carbon atoms is bonded to a surface or inside of aggregates of inorganic fine particles, and
   a fertilizer contained in a space surrounded by the photodegradable capsule.

2. The controlled-release fertilizer of claim 1, wherein the binder resin has a degradation rate of 35% or more which is derived from a weight change of the photodegradable capsule after irradiating a light having a wavelength of 300 to 800 nm to the fertilizer at an intensity of 400 w/m² for 224 hours.

3. The controlled-release fertilizer of claim 1, wherein the inorganic fine particles include a primary particle having a cross-sectional diameter of 5 to 50 nm.

4. The controlled-release fertilizer of claim 1, wherein the aggregates of inorganic fine particles have a cross-sectional diameter of 1 μm or less.

5. The controlled-release fertilizer of claim 1, wherein the aggregates of inorganic fine particles have a cross-sectional diameter of 0.05 μm to 0.5 μm.

6. The controlled-release fertilizer of claim 1, wherein the inorganic fine particles are titanium dioxide ($TiO_2$), zinc oxide (ZnO), or a mixture thereof.

7. The controlled-release fertilizer of claim 1, wherein the photocatalytic composite includes 1 to 500 parts by weight of the (meth)acrylate compound containing an alkylene glycol repeating unit having 1 to 10 carbon atoms relative to 100 parts by weight of the aggregates of inorganic fine particles.

8. The controlled-release fertilizer of claim 1, wherein the aggregates of inorganic fine particles are contained in an amount of 0.1 to 8 parts by weight relative to 100 parts by weight of the binder resin.

9. The controlled-release fertilizer of claim 1, wherein a weight ratio of the polyolefin:ethylene vinyl acetate copolymer in the binder resin is 1:1 to 6:1.

10. The controlled-release fertilizer of claim 1, wherein the polyolefin is at least one selected from the group consisting of a high-density or low-density polyethylene, a linear low-density polyethylene, a polypropylene, an ethylene-propylene copolymer, a polybutene, a butene-ethylene copolymer and a butene-propylene copolymer.

11. The controlled-release fertilizer of claim 1, wherein the ethylene vinyl acetate copolymer includes 1 to 45% by weight of the vinyl acetate repeating unit.

12. The controlled-release fertilizer of claim 1, wherein the (meth)acrylate compound containing an alkylene glycol repeating unit having 1 to 10 carbon atoms includes at least one selected from the group consisting of (meth)acrylates, di(meth)acrylates or esters thereof to which a polyalkylene glycol having a number average molecular weight of 100 to 2,000 is bonded; and trifunctional to octafunctional (meth)acrylates containing an alkylene glycol repeating unit having 1 to 10 carbon atoms, or esters thereof.

13. The controlled-release fertilizer of claim 12, wherein the (meth)acrylates, di(meth)acrylates or esters thereof to which a polyalkylene glycol having a number average molecular weight of 100 to 2,000 is bonded is poly(ethylene glycol)(meth)acrylate or poly(ethylene glycol)methyl ether (meth)acrylate, and
   the trifunctional to octafunctional (meth)acrylates containing an alkylene glycol repeating unit having 1 to 10 carbon atoms, or esters thereof is trimethylolpropane triacrylate, trimethylol propane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, or dipentaerythritol hexaacrylate.

14. The controlled-release fertilizer of claim 1, further comprising a filler dispersed in the binder resin.

15. The controlled-release fertilizer of claim 1, wherein the fertilizer is a granular fertilizer.

* * * * *